United States Patent [19]

Fujinami

[11] Patent Number: 4,846,316

[45] Date of Patent: Jul. 11, 1989

[54] HYDRAULIC RETARDER ATTACHED WITH PARKING BRAKE

[75] Inventor: Hideyuki Fujinami, Kitamoto, Japan

[73] Assignee: Akebono Brake Industry Co., Ltd., Tokyo, Japan

[21] Appl. No.: 180,955

[22] Filed: Apr. 13, 1988

[30] Foreign Application Priority Data

Apr. 15, 1987 [JP] Japan .................. 62-92854
Apr. 21, 1987 [JP] Japan .................. 62-98148

[51] Int. Cl.$^4$ .................. F16F 11/00; F16D 57/00
[52] U.S. Cl. .................. 188/271; 188/291; 192/3.23
[58] Field of Search .......... 188/360, 291, 292, 296, 188/290, 271; 192/4 B, 5.21, 3.23

[56] References Cited

U.S. PATENT DOCUMENTS

| | | | |
|---|---|---|---|
| 2,118,188 | 5/1958 | Gallup | 188/360 X |
| 2,292,633 | 8/1942 | Griswold | 192/3.23 X |
| 2,517,531 | 8/1950 | Anderson | 188/271 |
| 2,750,017 | 6/1956 | Ahlen | 192/4 B X |
| 2,787,170 | 4/1957 | Forster | 192/3.23 X |
| 3,041,892 | 7/1962 | Schjolin | 192/3.23 X |
| 3,130,827 | 4/1964 | Beeskow | 192/3.23 X |
| 3,882,975 | 5/1975 | Jedlitschke et al. | 192/4 B X |
| 4,235,320 | 11/1980 | Polak et al. | 188/271 X |
| 4,711,328 | 12/1987 | Bazilio et al. | |

FOREIGN PATENT DOCUMENTS

| | | | |
|---|---|---|---|
| 0471117 | 8/1937 | United Kingdom | 128/271 |
| 0965189 | 7/1964 | United Kingdom | 188/271 |
| 0837914 | 2/1939 | France | 192/3.23 |

Primary Examiner—Andres Kashnikow
Assistant Examiner—Richard Potosnak
Attorney, Agent, or Firm—Oblon, Spivak, McClelland, Maier & Neustadt

[57] ABSTRACT

A hydraulic retarder and brake unit mounted on a rotating vehicle drive shaft has a first rotatable member forming a brake drum and mounted on the drive shaft for rotation therewith. A non-rotatable member supports brake shoes movable into frictional engagement with a lining of the brake drum and are actuated by the lever for frictionally braking rotation of the drive shaft. A plurality of stator vanes are formed on the non-rotatable member. A second rotatable member is mounted on the drive shaft for free rotation independently of the rotation of the drive shaft, while a plurality of rotor vanes are freely rotatably mounted around the drive shaft and in facing opposition to the stator vanes for providing a hydraulic coupling. A clutch selectively rotatably couples the second rotatable member with the first rotatable member so that the rotor vanes are rotated with the drive shaft and the rotation of the drive shaft retarded. In an alternative embodiment, the clutch selectively rotatably couples the second rotatable members with the non-rotatable member and there is also included a planetary gear system including a sun gear formed on the second rotatable member, a ring gear formed with the rotor vanes and planet gears meshing with the sun and ring gears and rotatably mounted to the first rotatable member.

2 Claims, 3 Drawing Sheets

HYDRAULIC RETARDER ATTACHED WITH PARKING BRAKE

BACKGROUND AND SUMMARY OF THE INVENTION

The present invention relates to a device in which a hydraulic retarder used for large scale vehicles such as buses, trucks, etc. and a parking brake are united, and the performance of the fluid type retarder is improved.

Usually, there are three kinds of braking devices for motor cars, depending on the purposes for use: routine brake, parking brake and reduction device. Among them, the routine brake is a treadle type brake which brakes all of the wheels and is used for deceleration and stopping of the vehicle. The parking brake is a manual brake and there are both a type to act on the same elements as the routine brake for rear wheels, but through a different transmission mechanism, and a center brake used exclusively for parking by attaching to the transmission or the propeller shaft. The parking brake can be used for assistance at a time of breakdown of the routine brake and for stopping the vehicle at the time of emergency.

As such a parking brake, a duo-servo type drum brake is used generally, in which two brake shoes each laminated with brake lining on a semicircular member are connected through a link inside a brake drum rotatable with a wheel axle, and the rotation of the wheel axle is stopped by pressing these shoes against the brake drum through the operation of a parking lever.

The deceleration device is used for large scale trucks or buses due to the danger that, when descending a long slope, the braking performance is lowered with the routine brake alone due to the heat generation at the friction portion of the brake, and there must exist an exhaustion brake, hydraulic retarder, electromagnetic retarder, etc. Among them, the hydraulic retarder (hereinafter simply referred to as a retarder) exhibits a preferable characteristic as the deceleration device in that the absorbed horse power increases abruptly with an increase in the number of revolutions and is assembled most frequently into the transmission or the driving device of the rear wheels.

As shown in FIG. 3, the body of the retarder aforementioned is fixed radially with the wheel axle (101) as a center. A vane chamber (104) is provided around the wheel axle (101) and contains a plurality of rotor vanes (102) which rotate with the wheel axle (101) and is surrounded by a vane chamber case (103) stator vanes (105) fixed to the vane chamber case (103) are formed in said vane chamber (104) oppositely to the rotor vanes (102). For operating the retarder, cooling oil (A) is supplied to a portion between the opposing rotor vanes (102) and the stator vanes (105) in the vane chamber (104) to transmit the energy of rotating rotor vanes (102) to the circulating cooling oil as heat due to the viscosity of the cooling oil resulting in the deceleration.

Numeral (106) is a tank of cooling oil and numeral (107) shows an oil pump feeding the cooling oil to the retarder.

The control of the working of this retarder is accomplished by means of controlling the flow rate of cooling oil to be supplied into the vane chamber, that is, the level of the oil surface. Therefore, retardation is eliminated by discharging the cooling oil. However, retardation of retarder due to the remaining cooling oil that is, the drag torque, remains. Further, there have been such problems that the device for controlling the level of the oil surface is expensive and heavy in weight.

Moreover, the uniting of the retarder with the parking brake has been desired strongly for compactness and light weight.

The purpose of the invention is to provide a fluid type retarder attached with a parking brake, which eliminates the generation of said drag torque and is capable of being manufactured at low cost.

DETAILED DESCRIPTION OF THE INVENTION

Figure 1:
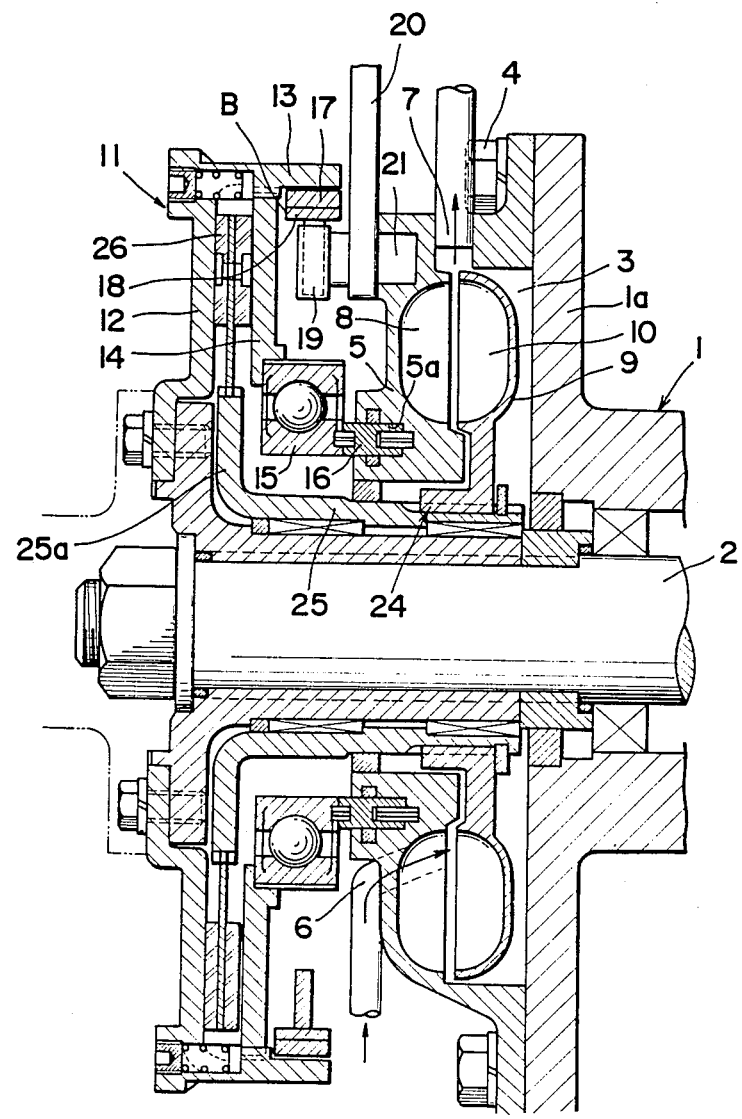
FIG. 1 is a cross section in side view showing the first example of the invention.

The first example of the invention will be illustrated in detail using FIG. 1.

In this example, a side plate (1a) of a transmission case (1), through which a drive shaft (2) passes, is made as one side plate of a vane chamber (3) of a retarder. The vane chamber (3) is covered fluid-tightly by means of a backing plate (5) attached to the transmission case (1) with a plurality of bolts (4). A supplying port (6) for supplying the cooling oil to said vane chamber (3) from lower portion and a discharging port (7) for discharging the cooling oil from upper portion are provided. And, on the side of vane chamber (3) of said backing plate (5), an annular plurality of semicircular stator vanes (8) are formed radially of the drive shaft (2) as a center. Opposite said stator vanes (8), an annular plurality of semicircular rotor vanes (10) are provided radially in a similar manner to a rotor (9) rotatable around the drive shaft (2).

In the inner circumference of said rotor (9), there exists a cylindrical member (25) which is in spline engagement (24) to said rotor. This cylindrical member (25) is extended from a space between the backing plate (5) and the drive shaft (2) to outside the vane chamber (3), while maintaining the sealing of vane chamber (3). From a flange (25a) rising at right angles to the drive shaft (2) from the end of said extension, a disk-like clutch plate (26) is supported. Further, outside said plate (26), a circular side plate (12) of a brake drum (11) rotatable and united with the drive shaft (2), is provided oppositely to the plate (26) and the outer circumferential portion of said side plate (12) is extended toward the transmission case (1) to form an outer circumferential plate (13) of the brake drum (11). Moreover, the outer circumference of a disk-like pressure plate (14) is fitted to said outer circumferential plate (13) so that said clutch plate (26) is put between the circular side plate (12) and the pressure plate (14) while the inner circumference of the latter is fixed to the circular outer ring of a clutch release bearing (15).

Furthermore, one end of the circular inner ring of the clutch release bearing (15) is fixed to a ring-shaped clutch piston (16) axially displaceable in a cylinder (5a) of said backing plate (5) so that said pressure plate (14) is pushed by actuating said piston (16) while said clutch plate (26) is held insertedly between the circular side plate (12) of the brake drum (11) and the pressure plate (14), the rotation of the drive shaft (2) thereby being transmitted to the rotor vanes (10) of the retarder through said clutch plate (26) and cylindrical member (25).

Moreover, inside the outer circumferential plate (13) of said brake drum (11), two semicircular brake shoes (18) laminated with a brake lining (17) are provided. The brake shoes (18) are allowed to be pressed against the outer circumferential plate (13) to construct a duo-servo type drum brake (B) for stopping the rotation of the brake drum (11), and a support shaft (21) of a parking lever (20) having a brake cam (19) to expand the brake shoes (18) outwardly is pivotally supported by the backing plate (5).

With the hydraulic retarder attached with the parking brake as above, when decelerating the motor car, the clutch is turned on by working the clutch piston (16), so that the rotation of the drive shaft (2) is transmitted to the rotor vanes (10) of the retarder and, by the self-pumping action of the rotor vanes (10) or by supplying the cooling oil into the vane chamber (3), the rotation of rotor vanes (10) and the drive shaft (2) can immediately be braked. Also, when turning off the retarder, by acting on the clutch piston (16) to turn off the clutch, the rotation of the drive shaft (2) becomes instantaneously separated from braking of the retarder and thus from the drag torque. The response at the time of re-acceleration thus becomes good. Moreover, when parking, the brake lining (17) is pressed against the outer circumferential plate (13) of the brake drum (11) by operating the manual type parking lever (20) to allow the drive shaft (2) to stop.

Figure 2:
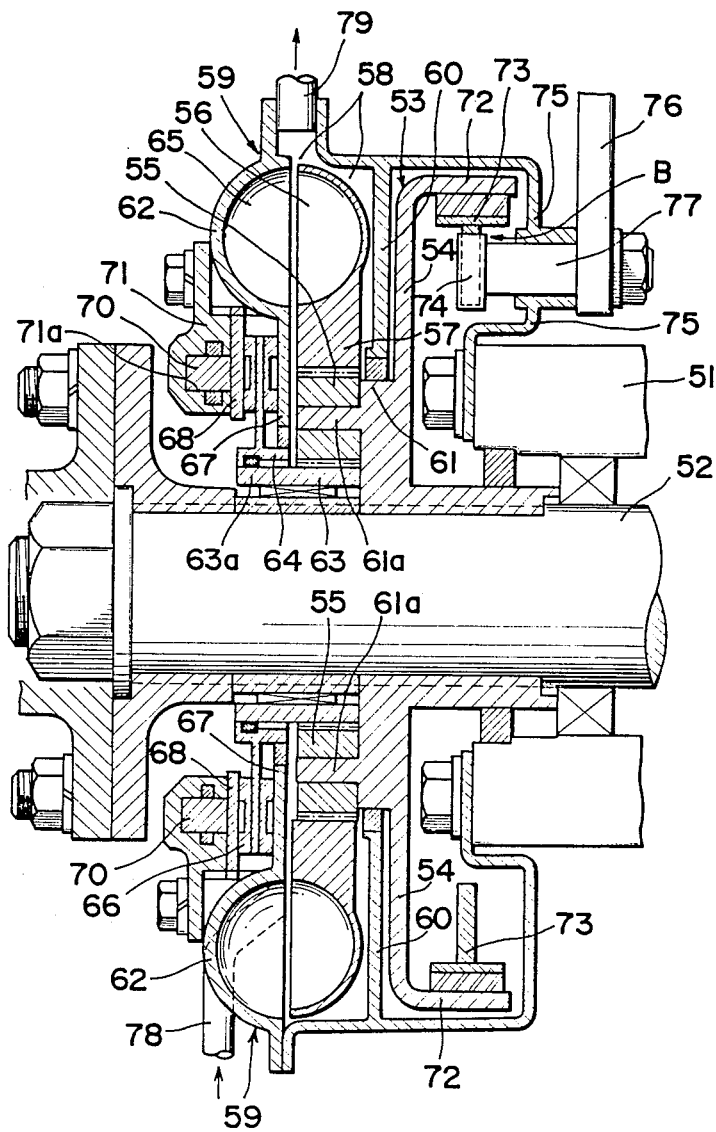
FIG. 2 is a cross section in side view showing the second example of the invention.
Figure 3:
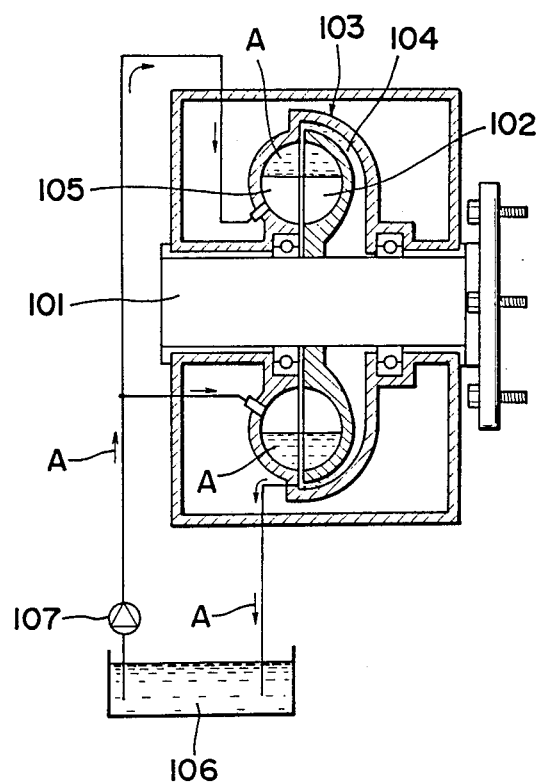
FIG. 3 is a cross section in side view showing the conventional device.

The second example of the invention will be illustrated in detail using FIG. 2.

In this example, a plurality of planetary gears (55) are provided at a protrusion (61a) protruded from a step portion (61) of a circular side plate (54) of a brake drum (53) which rotates unitedly with a drive shaft (52) protruding from a transmission case (51). And, to a rotor (57) forming an outer ring gear inscribing said gears (55), a plurality of rotor vanes (56) are provided, radially making the drive shaft (52) as a center. A vane chamber case (59) is formed unitedly with the transmission case (51) so that a vane chamber (58) of the retarder is formed around the drive shaft (52) surrounding said rotor (57). One side plate (60) of said vane chamber case (59) is allowed to slide fluid-tightly on the step portion (61) of the brake drum (53). Other side plate (62) is allowed to slide fluid-tightly on a cylindrical member (64) fixed unitedly to an extended end (63a) at which an inner sun gear (63) circumscribing said planetary gears (55) and being rotatable around the drive shaft (52) is provided on the opposite side to the brake drum (53). Moreover, in the vane chamber (58) of this other side plate (62), a plurality of stator vanes (65) are provided radially having the drive shaft (52) as a center so that they face opposedly to the plurality of rotor vanes (56).

Further, a clutch plate (66) is provided unitedly with said cylindrical member (64) to face opposedly to a clutch cover (67) formd unitedly inside the side plate (62) of said vane chamber case (59). On the opposite side to the clutch cover (67) of the clutch plate (66), a disk-like pressure plate (68) is provided. By pushing the pressure plate (68) with the clutch plate (66) held insertedly between said plate (68) and clutch cover (67), the movement of turning on the clutch is realized. A ring-shaped clutch piston (70) actuates the retarder to transmit the rotation of drive shaft (52) to the rotor vanes (56) of the retarder. The clutch piston (70) is inserted in a cylinder (71a) of a backing plate (71) fixed to the vane camber case (59).

When the clutch piston (70) is retracted, rotation of the drive shaft (52) rotates gears (55) and sun gear (63) via side plate (54), while the rotor (57) remains stationary. However, when the clutch piston (70) is advanced to lock the sun gear (63), rotation of the drive shaft rotates rotor (57) via side plate (54) and gears (55).

Furthermore, to the inside of an outer circumferential plate (72) provided by extending the outer circumference of the circular side plate (54) of said brake drum (53) toward the transmission case, one of the butted portions of two semicircular brake shoes (73) is connected through a link and, between their other butted portion, a brake cam (74) is provided for actuating a duo-servo type drum brake (B). And a support shaft (77) transmitting the rotation force due to the operation of the parking lever (76) to said brake cam (74) is pivotally supported by a support plate (75) formed unitedly with the transmission case (51).

At a lower portion of the vane chamber (58) of such fluid type retarder attached with the parking brake, a supplying port (78) of the cooling oil is provided and, at an upper portion, a discharging port (79) of the cooling oil is provided. When the retarder is actuated by working the clutch piston (70) and turning on the clutch after allowing the drive shaft (52) to rotate and supplying the cooling oil, and then the clutch is turned off, the drag torque was not generated to the drive shaft (52) at all. Further, the same controls can also serve as a control lever for the exhaustion brake and can be operated easily only by on-off of the clutch. Therefore, complex control of the level of oil surface etc. is unnecessary.

As described in accordance with the invention, since the fluid type retarder and the parking brake are united, reduced bulk and weight are realized and the decrease in cost is achieved. Further, according to the invention, a hydraulic retarder with simple and sure controlling can be realized and, in addition, maintenance such as the exchange of clutch facings and brake linings etc. is easy and the performance of the hydraulic retarder is improved. For these reasons and others, the invention exerts a remarkable effect industrially.

What is claimed is:

1. A hydraulic retarder and brake unit mounted on a rotating vehicle drive shaft and comprising:

a first rotatable member forming a brake drum and mounted on said drive shaft for rotation therewith;

a non-rotatable member supporting brake shoes movable into frictional engagement with said brake drum for frictionally braking rotation of said drive shaft, said non-rotatable member also forming a plurality of stator vanes;

lever means directly engaging said brake shoes for actuating said brake shoes into frictional engagement with said brake drum;

a second rotatable member mounted on said drive shaft for free rotation independently of the rotation of said drive shaft;

means mounted for rotation with said second rotatable member for defining a plurality of rotor vanes in facing opposition to said stator vanes;

means for providing a viscous fluid between said stator and rotor vanes, whereby a rotational speed differential between said non-rotatable member and said rotor vanes can be hydraulically retarded; and clutch means for selectively rotatably coupling said second rotatable member with said first rotatable member, whereby said means for defining a plurality of rotor vanes may be rotated with said drive shaft and the rotation of said drive shaft is retarded.

2. A hydraulic retarder and brake unit mounted on a rotating vehicle drive shaft and comprising:

a first rotatable member forming a brake drum and mounted on said drive shaft for rotation therewith;

a non-rotatable member supporting brake shoes movable into frictional engagement with said brake drum for frictionally braking rotation of said drive shaft, said non-rotatable member also forming a plurality of stator vanes;

lever means directly engaging said brake shoes for actuating said brake shoes into frictional engagement with said brake drum;

a second rotatable member mounted on said drive shaft for free rotation independently of the rotation of said drive shaft;

means for defining a plurality of rotor vanes in facing opposition to said stator vanes;

means for providing a viscous fluid between said stator and rotor vanes, whereby a rotational speed differential between said non-rotatable member and said rotor vanes can be hydraulically retarded;

clutch means for selectively rotatably coupling said second rotatable members with said non-rotatable member;

a sun gear formed on said second rotatable member;

a ring gear formed on said means for defining a plurality of rotor vanes; and at least one planet gear meshing with said sun and ring gears and rotatably mounted to said first rotatable member, whereby said means for defining a plurality of rotor vanes may be rotated with said drive shaft and the rotation of said drive shaft is retarded.

* * * * *